United States Patent [19]
Patzke

[11] 3,966,321
[45] June 29, 1976

[54] DUPLICATING MACHINE EXPOSURE SYSTEM

[75] Inventor: Robert C. Patzke, Prospect Heights, Ill.

[73] Assignee: Addressograph-Multigraph Corporation, Cleveland, Ohio

[22] Filed: July 3, 1974

[21] Appl. No.: 485,346

[52] U.S. Cl................................ 355/121; 355/115; 355/120
[51] Int. Cl.²....................................... G03B 27/04
[58] Field of Search ........... 355/115, 120, 121, 124, 355/128

[56] References Cited
UNITED STATES PATENTS

| | | | |
|---|---|---|---|
| 1,004,670 | 10/1911 | Miller ................................ | 355/121 |
| 3,140,645 | 7/1964 | Block et al...................... | 355/115 X |
| 3,642,376 | 2/1972 | Halvorsen et al.................. | 355/128 |
| 3,738,748 | 6/1973 | Weihsmantel ...................... | 355/121 |

FOREIGN PATENTS OR APPLICATIONS

| | | | |
|---|---|---|---|
| 504,367 | 7/1920 | France................................ | 355/121 |
| 739,987 | 11/1955 | United Kingdom................. | 355/121 |
| 25,613 | 11/1906 | United Kingdom................. | 355/121 |

Primary Examiner—L. T. Hix
Assistant Examiner—James LaBarre
Attorney, Agent, or Firm—Mason, Kolehmainen, Rathburn & Wyss

[57] ABSTRACT

An exposure system for a microfiche duplicating machine includes a mercury vapor light source and a light transparent platen disposed above the light source for supporting an original microfiche card and a duplicating film card for exposure by the light source. A shutter mechanism is interposed between the light source and the transparent platen to control the exposure of the duplicating film card, and a cover is disposed over the transparent platen to prevent the escape of light from the duplicating machine during the exposure. A mechanical linkage is provided for automatically opening a pair of shutters within the shutter mechanism upon the closing of the cover to initiate the exposure of the duplicating film card. Simultaneously, a timer is energized by the closing of the cover to initiate an exposure timing sequence. Upon completion of the timing sequence, a timer energized by a solenoid actuator releases the cover, and the shutters are automatically closed by the mechanical linkage to terminate the exposure.

23 Claims, 13 Drawing Figures

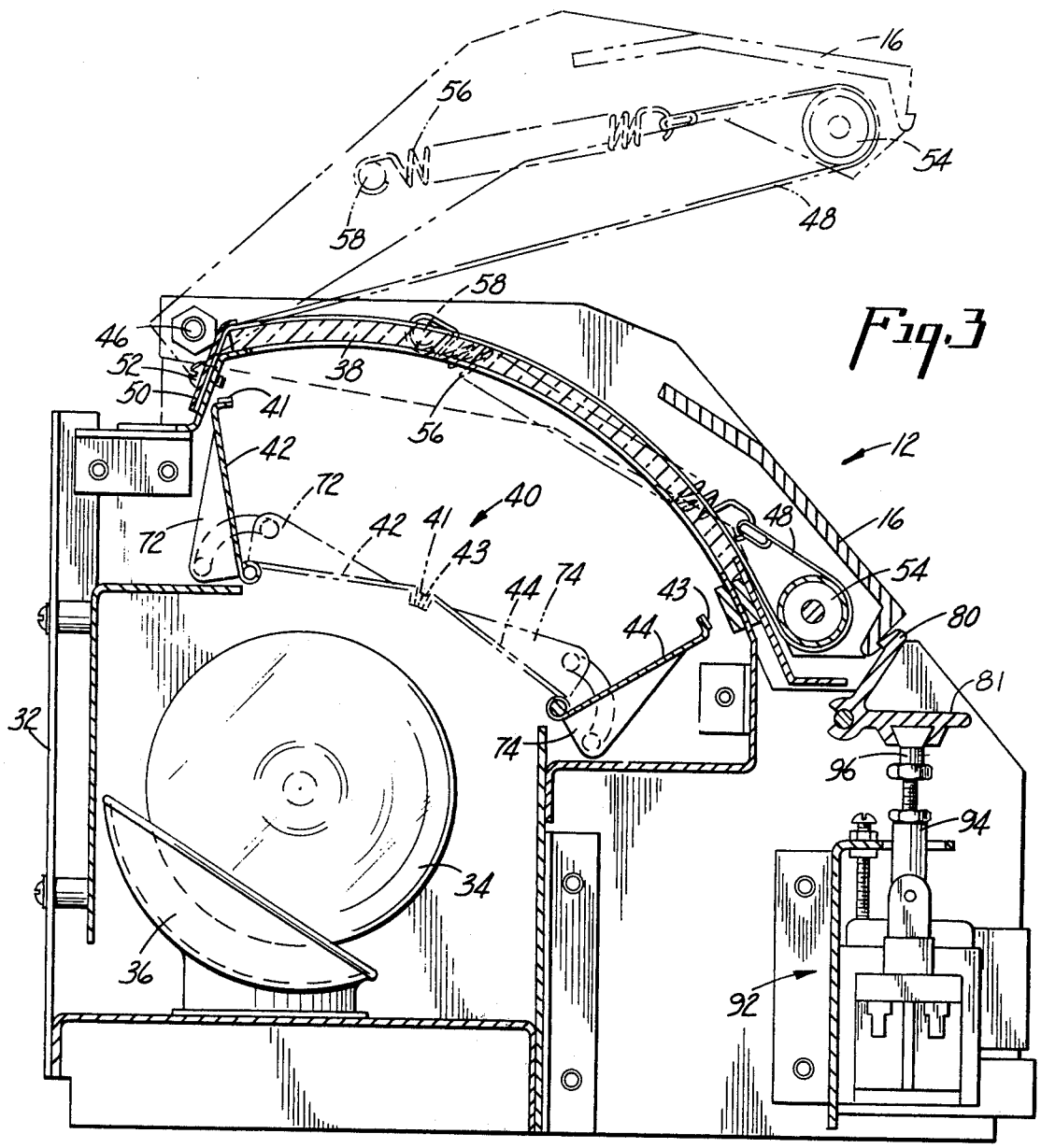
Fig. 3
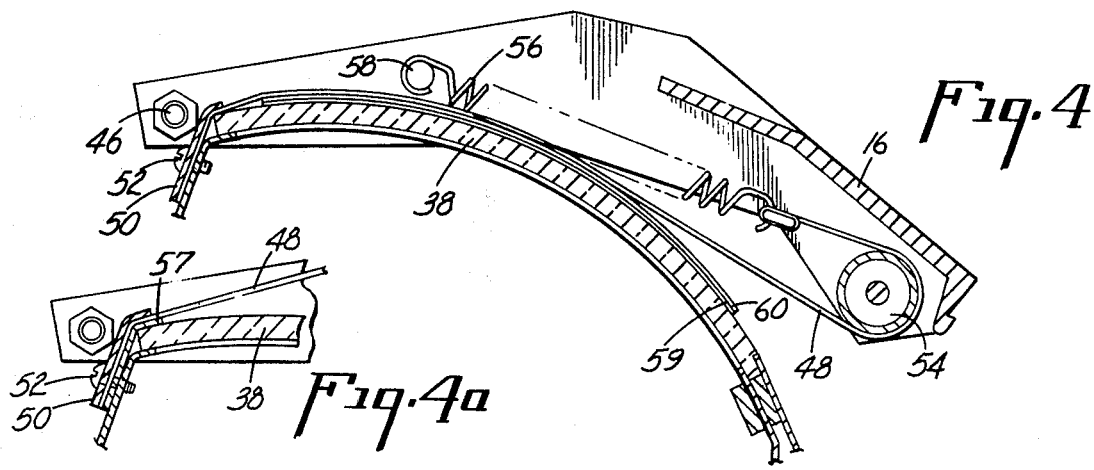
Fig. 4
Fig. 4a

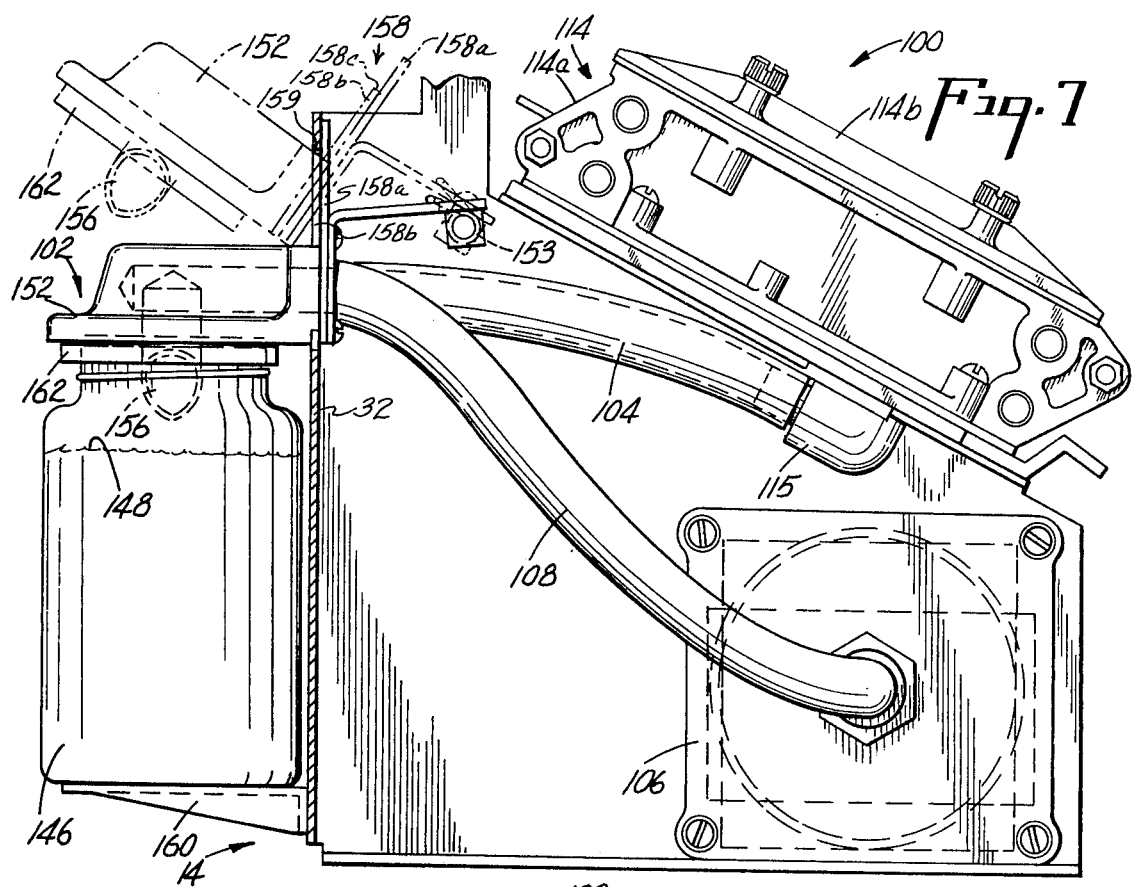
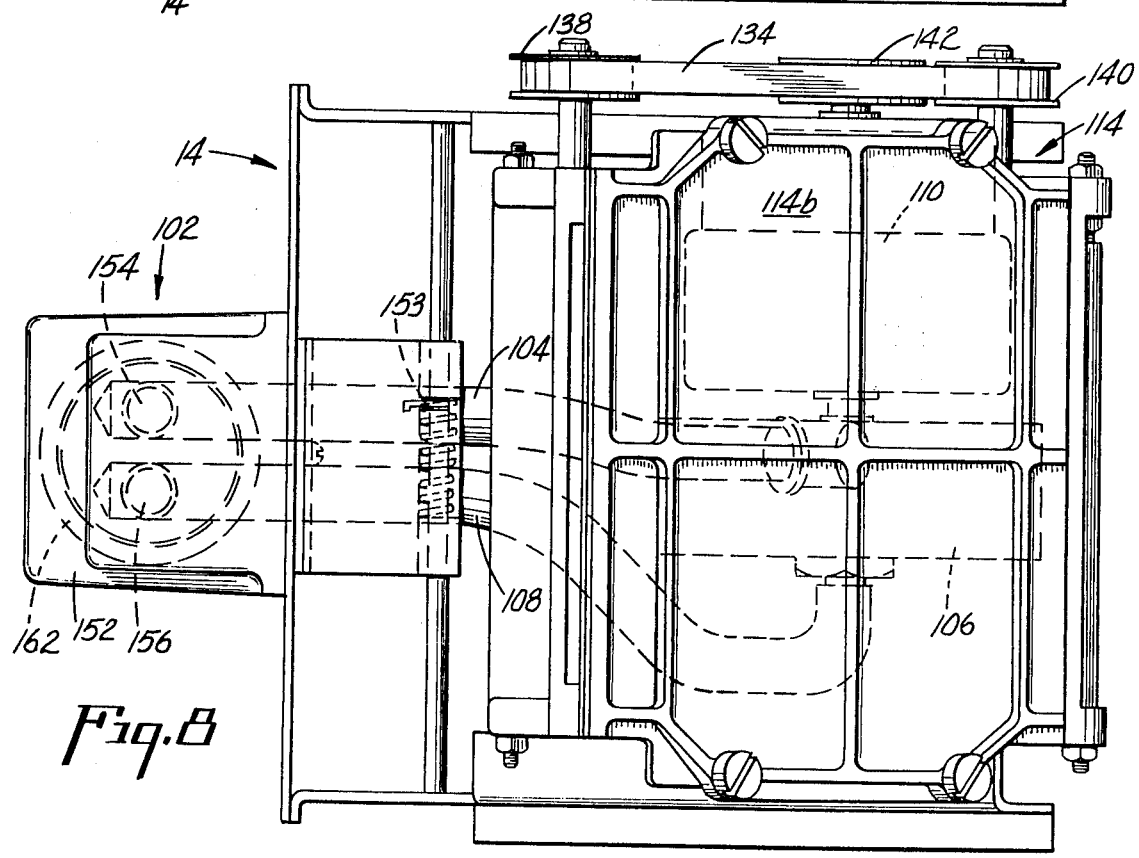

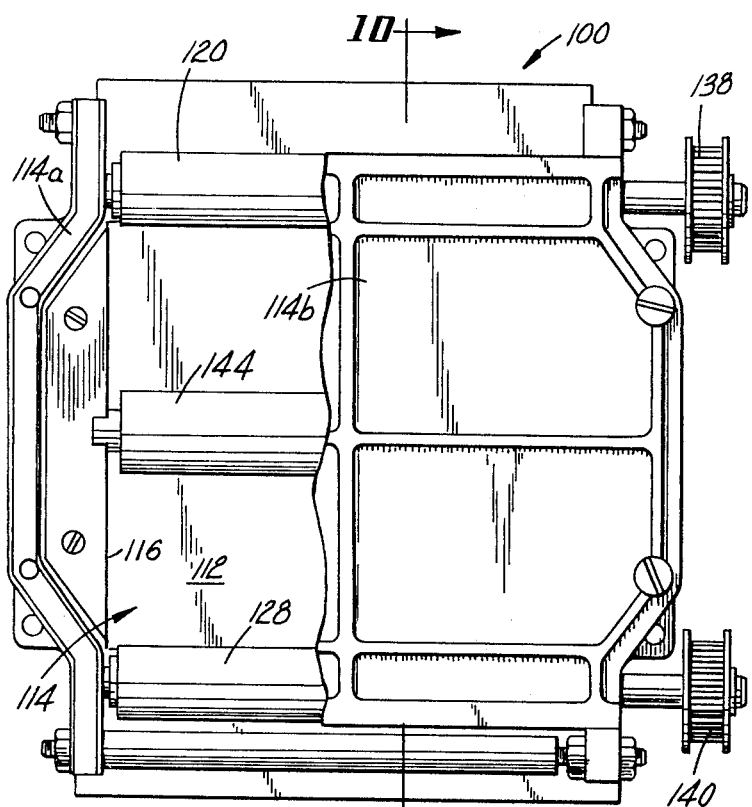
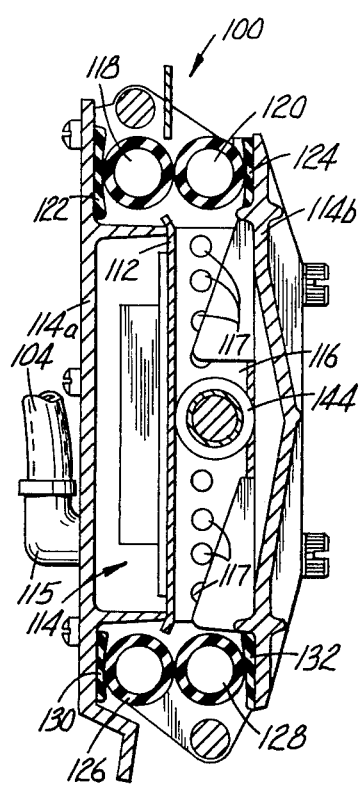
Fig.9   Fig.10
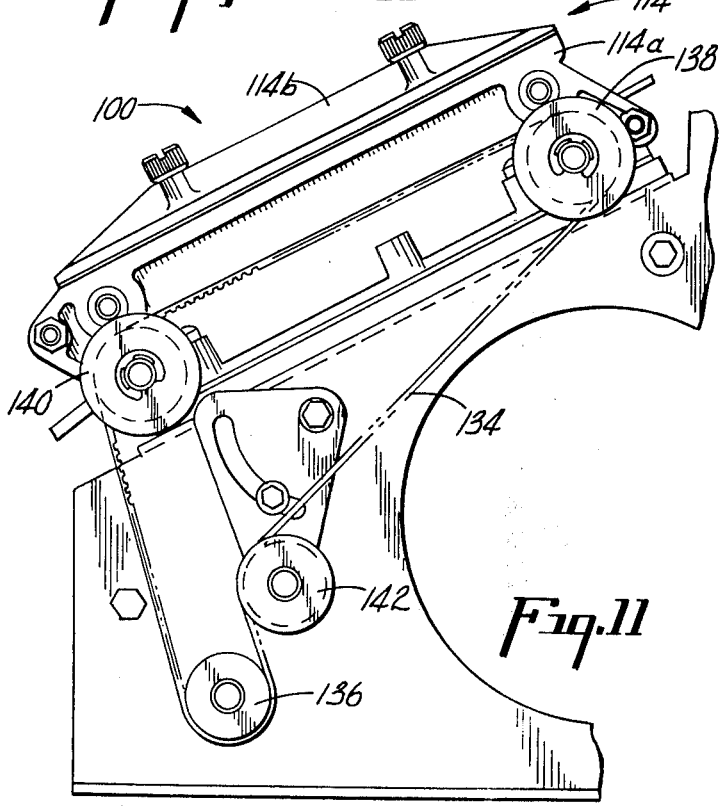
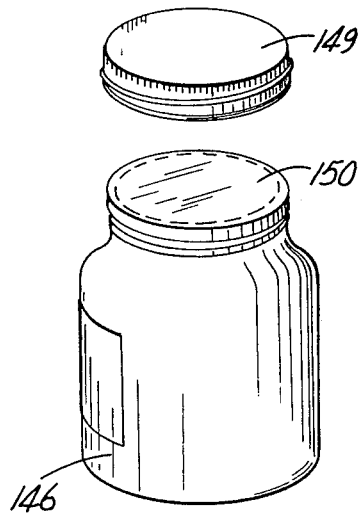
Fig.11   Fig.12

DUPLICATING MACHINE EXPOSURE SYSTEM

BACKGROUND OF THE INVENTION

1. Field of the Invention

The invention relates generally to devices for photographically reproducing originals onto a duplicating medium and, more particularly, to an improved shutter system for controlling the exposure of the duplicating medium.

2. Description of the Prior Art

Information storage in the form of micro-images on microfiche cards or the like has become quite commonplace. As a result, a need has arisen to provide machines for duplicating such microfiche cards quickly and with relatively inexpensive apparatus.

Several machines for duplicating microfiche cards are known. The prior art machines generally employ a special purpose high intensity light source capable of being rapidly switched on and off. The light source must have a high intensity to minimize the required exposure time, and a fast response time to provide accurate exposure. In order to provide a rapidly responding high intensity light source, a special purpose lamp and power supply are generally required, thereby making the prior art machines relatively complex and costly.

SUMMARY OF THE INVENTION

An object of the present invention is to provide a new and improved device for duplicating micro-images stored in microfiche or similar form.

Another object of the present invention is to provide an improved duplicating machine exposure system.

Another object of the present invention is to provide a compact, low cost exposure system utilizing a low cost light source.

Briefly, the exposure system of the present invention comprises a low cost light source, such as a mercury vapor lamp, and an automatic shutter system interposed between the lamp and the duplicating medium to be exposed. A cover is disposed over the medium to be exposed to prevent the leakage of light from the duplicating machine during exposure. A mechanical linkage coupling the cover and the shutter mechanism automatically opens the shutters of the shutter mechanism upon the closing of the cover. The closing of the cover simultaneously activates a switch which energizes a timer to initiate an exposure timing sequence. After the completion of the exposure timing sequence, the timer energizes a cover latching solenoid actuator to release the cover. Upon release of the cover, the shutters automatically close to protect the eyes of the operator, and the cover partially opens to permit the removal of the original and the exposed duplicating medium. The shutter mechanism permits a low cost mercury vapor lamp of the type frequently used for street lighting purposes to be used as the source of illumination for exposing the duplicating medium. Such a low cost lamp would ordinarily not be usable without the shutter system according to the invention because the relatively long warm up time required for the lamp to reach its full brightness would preclude accurate exposure.

BRIEF DESCRIPTION OF THE DRAWING

The above and other objects and advantages and novel features of the present invention will appear from the following detailed description of a preferred embodiment of the invention illustrated in the accompanying drawing wherein:

FIG. 3 is a sectional side view of the duplicating machine of FIG. 1 showing the shutter assembly;

FIG. 4 is a partial side sectional view of the duplicating machine showing the details of the cover;

FIG. 4a is a partial side sectional view similar to FIG. 4 showing an optional registry bar;

FIG. 7 is a sectional side view of the duplicating machine showing apparatus for developing the duplicating medium subsequent to exposure;

FIG. 8 is a top view of the developing apparatus shown in FIG. 7;

FIG. 9 is a cut-away top view of a developing chamber employed in the apparatus of FIGS. 7 and 8;

FIG. 10 is a sectional side view of the developing chamber taken along lines 10—10 of FIG. 9;

FIG. 11 is a side view of the developing chamber and supporting structure shown in FIG. 9; and FIG. 12 is a perspective view of a developer container for use with the developing apparatus shown in FIGS. 7–11.

DETAILED DESCRIPTION

Figure 1:
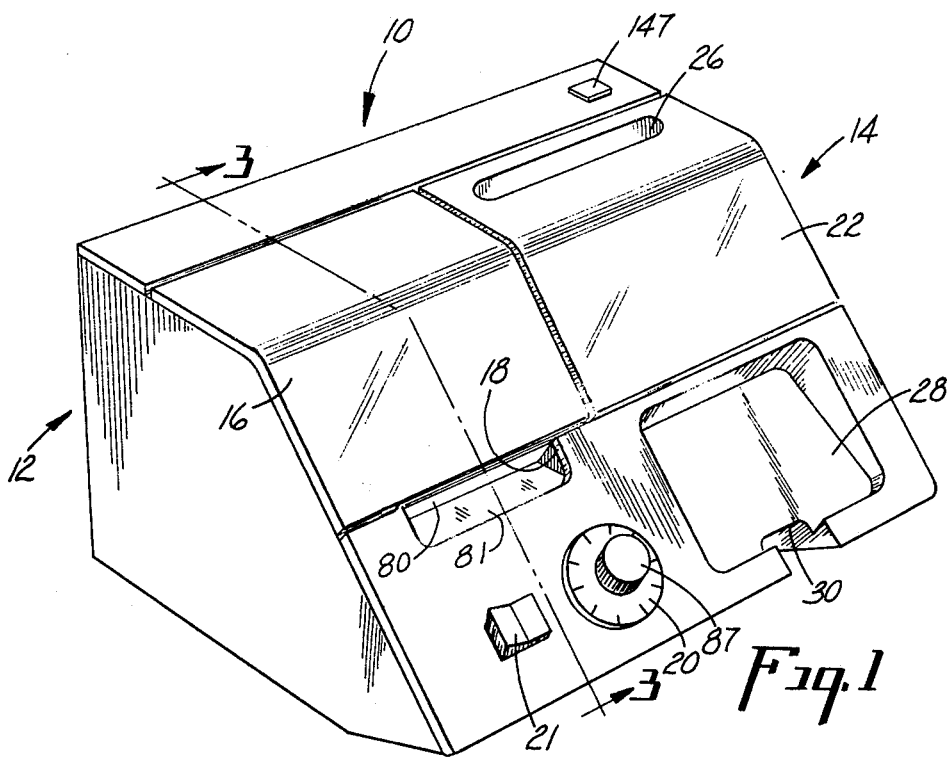
FIG. 1 is a front perspective view of a micro-image duplicating machine utilizing the exposure system according to the present invention.
Figure 2:
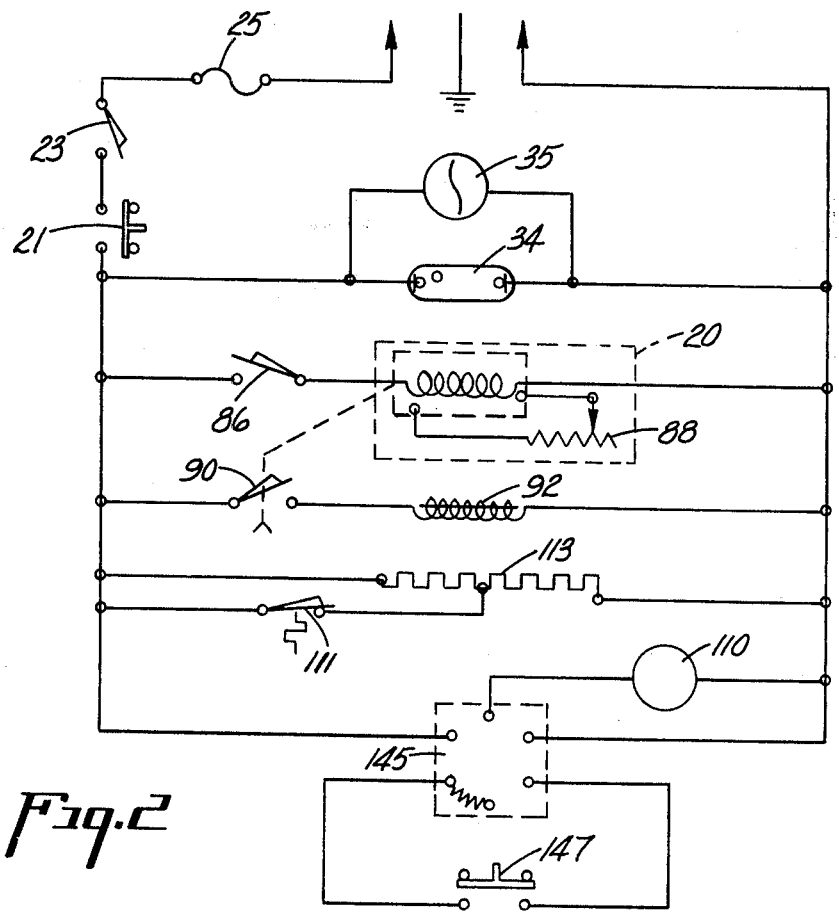
FIG. 2 is a schematic circuit diagram of the control circuitry of the duplicating machine of FIG. 1, including circuitry for operating the exposure system of the present invention.

Referring to the drawing and initially to FIG. 1, there is illustrated a new and improved microfiche duplicating machine, generally designated as 10, constructed in accordance with the principles of the present invention. The microfiche duplicating machine 10 has an exposure unit, generally designated as 12, and a developing unit generally designated as 14. The exposure unit 12 has a hinged cover 16 for providing access to the exposure unit and for preventing the leakage of light from the machine during exposure of a duplicating film card. The cover 16 is latched during exposure, and a finger recess 18 is provided under the cover 16 to permit the cover 16 to be readily released by an operator. A timer 20 is provided to control the exposure time of the film card. A main power switch 21 is utilized to apply operating power to the machine 10. An interlock 23 interrupts power to the machine 10 when the machine is dismantled for service, and a fuse 25 prevents damage in the event of a short or overload condition (FIG. 2).

Exposure of the duplicating film card is achieved by opening the cover 16 and placing a microfiche original over a curved platen disposed beneath the cover 16. The curved platen is more fully described in conjunction with FIGS. 3 and 4 in a subsequent portion of the disclosure. The duplicating film card to be exposed is placed over the microfiche original and the cover 16 is closed to prevent the leakage of light from the exposure unit 12 and to maintain the microfiche original and the duplicating film card in contact with the curved platen. The closing of the cover 16 automatically initiates the exposure of the film card and starts a timing sequence, the duration of which is determined by the setting of the exposure timer 20. Upon completion of the exposure sequence, the timer 20 energizes a solenoid actuator to open the cover 16. This terminates the exposure process and allows the microfiche original and the exposed film card to be removed from the exposure unit 12.

The developer unit 14 has an access door 22 for providing access to the developer unit 14 for adjustment and repair. The access door 22 may conveniently be gripped by one of its vertical edges when access to the developer unit 14 is desired. A slot 26 is provided in the top of the access door 22 for the insertion of exposed duplicating film cards into the developer unit 14. A recessed tray 28 is provided in the base of the unit 10 to receive the developed duplicating film cards from the developer unit 14. A slot 30 in the base of the unit 10 intersecting the recessed tray 28 allows the developed film cards to be readily grasped and removed from the recessed tray 28.

The exposed film card is developed by inserting it into the slot 26. A transport mechanism (shown in FIGS. 7–11) transports the exposed film card through the developer unit 14 and deposits the developed film card in the recessed tray 28. The details of the development process are more fully described in conjunction with FIGS. 7–12 in a subsequent portion of the disclosure.

Figure 5:
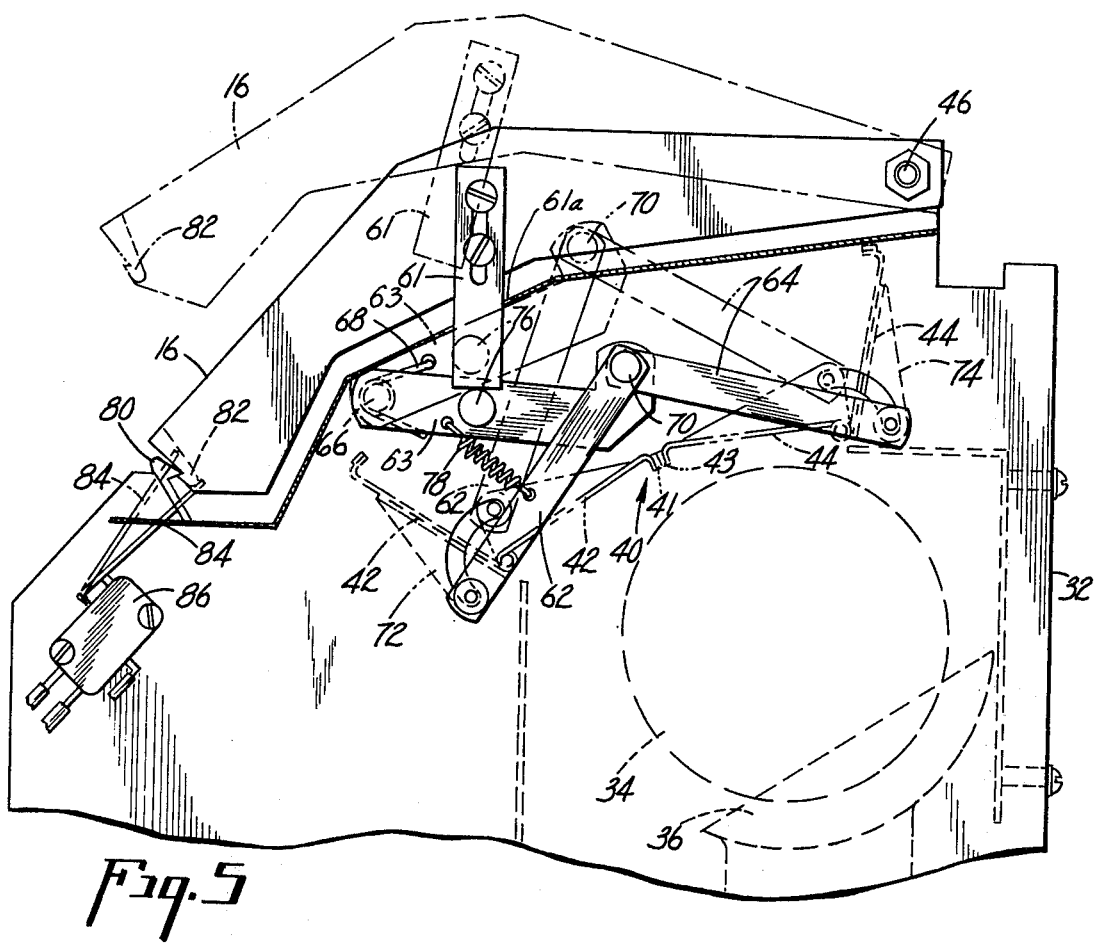
FIG. 5 is a sectional side view of the duplicating machine showing the shutter operating linkage.

The details of the exposure unit are best illustrated in FIGS. 3–5. The exposure unit 12 comprises a housing 32 containing a source of illumination, in this embodiment, a mercury vapor lamp 34 and a reflector 36. The mercury vapor lamp 34 may be a low cost lamp of the type commonly used for street lighting purposes. A fan 35 (FIGS. 2 and 6) connected in parallel with the lamp 34 is provided for cooling the lamp 34 whenever the lamp is energized. A curved platen 38 fabricated from light transmissive material such as glass is supported above the lamp 34. A curved platen 38 rather than a flat platen is employed because even illumination of a curved platen can be obtained at a relatively short distance between the platen and the light source. A flat platen requires a greater distance between the platen and the light source for even illumination, and would increase the physical size of the duplicating machine.

A shutter mechanism 40 having a pair of shutters 42 and 44 is interposed between the lamp 34 and the curved platen 38. The shutters 42 and 44 are fabricated from an opaque material and serve to prevent light from the lamp 34 from reaching the platen 38 when the shutters are in a closed position. The shutters 42 and 44 are shown in an open position with solid lines and in a closed position with phantom lines. Resilient light seals 41 and 43 are affixed to the edges of the shutters 42 and 44, respectively, and serve to prevent the leakage of light from between the shutters 42 and 44.

One edge of the cover 16 is pivotally attached to the housing 32 by a bolt 46. The flexible band 48 is attached at one end and to the housing 32 near the top edge of the platen 38 by a retaining clip 50 and a retaining screw 52. The other end of the band 48 is passed over a roller 54 rotatably mounted within the cover 16. A pair of springs 56 is utilized to resiliently attach the last mentioned end of the band 48 to a pair of retaining pins 58 extending inwardly from opposite sides of the cover 16. Optionally, a registry bar 57 for aligning the original and the duplicating film card for exposure may be interposed between the platen 38 and the band 48 (FIG. 4a).

The band 48 serves to retain the microfiche original and the duplicating film card against the curved platen 38 during exposure. When a microfiche card is to be duplicated, the cover 16 is opened and a microfiche original 59 (FIG. 4) is placed over the platen 38. A duplicating film card 60 is placed over the microfiche original 59, and the cover 16 is closed. If a registry bar 57 is employed, one edge of the microfiche original 59 and the duplicating film card 60 is placed against the registry bar 58. If no registry bar is employed, the microfiche original 59 and the duplicating film card 60 are inserted under the belt 48 near the top of the platen 38. As the cover 16 is closed, the belt 48 is gradually brought into contact with the duplicating film card 60 starting from an area near the top of the platen 38 and gradually working toward the bottom of the platen 38. As the point of contact between the belt 48 and the duplicating card 60 gradually progresses from near the top of the platen 38 toward the bottom of the platen 38, the sweeping motion of the point of contact drives out air trapped between the microfiche original 59 and the duplicating film card 60 to provide an intimate contact between the cards 59 and 60 to assure maximum resolution in the duplicated card.

The cover 16 has a shutter actuating member 61 (FIG. 5) attached thereto. The member 61 passes through a slot 61a in the housing 32 and opens the shutters 42 and 44 during the last increment of cover travel as the cover 16 is closed. The length of the actuating member 61 is adjusted so that the shutters 42 and 44 are not opened until the cover is substantially closed, and are immediately closed when the cover is released following exposure.

The shutter mechanism 40 includes a linkage having three linkage arms 62, 63 and 64. The linkage arm 63 is pivotally attached to the housing 32 by a post 66. A torsion spring 68 is wound around the post 66 and engages the linkage member 63 to resiliently bias the linkage member 63 for maintaining the shutters 42 and 44 in a closed position. The linkage members 62 and 64 are pivotally attached to the linkage member 63 by a pivotal connection 70. The other ends of the linkage members 62 and 64 pivotally attached to a pair of brackets 72 and 74 extending outwardly in a direction perpendicular to the plane of the shutters 42 and 44, respectively. A post 76 extending perpendicularly from the linkage member 63 is provided for engaging the actuating member 61 when the cover 16 is closed. A biasing spring 78 interconnects the linkage members 62 and 63. The biasing spring 78 aids the torsion spring 68 in biasing the shutter mechanism 40 in a closed position, and assures that the linkage member 62 is returned from the over center condition that occurs when the shutters are open.

In operation, when the cover 16 is in its open position, the shutter mechanism 40 is biased to maintain the shutters 42 and 44 in a closed position to protect the eyes of the operator during the time that the microfiche original 60 and the duplicating film card 62 are being placed on the platen 38. As the cover 16 is closed subsequent to the placement of the cards on the platen 38, the actuating member 61 enters the slot 61a in the housing 32 and engages the post 76. As the post 76 is engaged, the linkage member 63 is pivoted in a clockwise direction to force the apex of the triangle formed by the linkage members 62 and 64 in a downward direction. The downward force applied to the apex is transmitted to the brackets 72 and 74. The force thus applied to the brackets 72 and 74 causes the shutter 42 to pivot in a counterclockwise direction and the shutter 44 to pivot in a clockwise direction to open the shutters and initiate the exposure cycle.

After the cover 16 has been completely closed to initiate the exposure cycle, the cover 16 is maintained in a closed position during the exposure cycle by a solenoid actuated latch 80 (FIGS. 3 and 5). The latch 80 is provided with a horizontal portion 81 (FIGS. 1 and 3) engageable by the operator for manually releasing the cover 16 prior to the completion of the exposure cycle or in the event of a power failure. The cover 16 is provided with a protrusion 82 (FIG. 5) for engaging a switch arm 84 of a latch switch 86 upon the closing of the cover 16. The latch switch 86 applies power to the timer 20 (FIGS. 1 and 2) when the cover 16 is in a closed position. After a predetermined exposure time determined by the setting of a control knob 87 which adjusts a variable resistor 88 within the timer 20, the timer 20 closes a set of switch contacts 90 to energize a solenoid 92. The solenoid 92 has an armature 94 (FIG. 3) attached to the latch 80 by an adjustable coupling mechanism 96 and serves to release the door 16 when the solenoid 92 is energized.

As the cover 16 is released, the shutter mechanism 40 is closed by the biasing springs 68 and 78. Simultaneously, the tension applied to the belt 48 by the springs 56 reacts against the platen 38 to partially open the cover 16. The partially opened cover can readily be grasped and completely opened by the operator to facilitate removal of the microfiche original 59 and the exposed duplicating film card 60.

After the microfiche duplicating card has been exposed by the exposure unit 12, it is developed by the developer unit 14 shown in greater detail in FIGS. 9–11. Briefly, the developer unit 14 is a developer unit of the type that develops diazo film in the presence of heat in an ammonia atmosphere. The developer unit 14 utilizes a hot plate developer 100 to accomplish the developing.

Ammonia for the hot plate developer 100 is stored in an ammonia container 102 as a concentrated solution of ammonium hydroxide, and ammonia gas emanating from the ammonium hydroxide solution is applied to the hot plate developer 100 by means of a flexible tube 104. A fan 106 blows air through a flexible tube 108 into the ammonia container 102 to force the ammonia from the container 102 into a hot plate developer 100. The fan 106 is driven by an electric motor 110 which also drives a set of film transport rollers within the hot plate developer 100.

The hot plate developer 100 has an electrically heated heat transfer plate 112 positioned inside an ammonia chamber 114 which comprises a body portion 114a and a cover portion 114b. The heating of the heat transfer plate 112 may be accomplished by means of a conventional resistance heating element 113 controlled by a thermostatically controlled switch 111 to maintain the heat transfer plate 112 at a substantially constant temperature (FIG. 2).

Ammonia from the ammonia container 102 enters the chamber 114 through a fitting 115 below the heat transfer plate 112 and flows around the heat transfer plate 112 to a portion of the ammonia chamber 114 above the heat transfer plate 112. As the ammonia flows around the heat transfer plate 112, it is heated to a temperature of approximately 175° F. A pair of side walls 116, having a series of apertures 117, extend upwardly from the plate 112, and serve to distribute the heated ammonia over the upper surface of the heat transfer plate 112.

A pair of feed rollers 118 and 120 are disposed at one end of the ammonia chamber 114 in parallel relationship to the heat transfer plate 112. Leakage of ammonia from the chamber 114 is minimized by maintaining the feed rollers 118 and 120 in contact with each other and by providing a pair of seals 122 and 124 between the feed rollers 118 and 120 and the walls of the chamber 114 adjacent thereto. A pair of delivery rollers 126 and 128 are disposed at an opposite end of the heat transfer plate 112 and are similarly sealed by a pair of seals 130 and 132.

The rollers 118 and 126 are driven by an electric motor 110. A drive belt 134 is provided for transmitting power from the motor 110 to the rollers 118 and 126. The drive belt 134 engages a pulley 136, mounted on the shaft of the motor 110, and a pair of pulleys 138 and 140 attached to the rollers 118 and 126. An idler pulley 142 is provided to adjust the tension of the drive belt 134. The rollers 120 and 128 are driven by the rollers 118 and 126, respectively.

To develop the exposed film, the exposed duplicating film card 60 is inserted between the feed rollers 118 and 120 which are positioned below the slot 26 (FIG 1). The duplicating film card 60 is oriented so that the base material of the film contacts the heated plate 112 and the emulsion side is exposed to the ammonia atmosphere within the ammonia chamber 114. The exposed duplicating film card 60 is drawn into the ammonia chamber 114 by the feed rollers 118 and 120 and passed over the heat transfer plate 112. As the exposed duplicating film card 60 passes over the heat transfer plate 112, heat is applied from the heat transfer plate 112 to the base material of the card 60 by conduction. A pressure roller 144 fabricated from heat resistant material is positioned above the heat transfer plate 112 to force the duplicating film card 60 into intimate contact with the heat transfer plate 112. The pressure thus applied aids in the transfer of heat to the duplicating film card 60 and speeds up the developing process. The pressure applied by the pressure roller 144 is so effective that most of the heat transfer between the heat transfer plate 112 and the duplicating film card 60 occurs in the region under the roller 144. Finally, after the exposed duplicating film card 60 has passed over the heat transfer plate 112, it is engaged by the delivery rollers 126 and 128 and expelled into the recessed tray 28 (FIG. 1) in the housing of the machine 10.

The developing process described above requires approximately 28 seconds. In order to conserve power and reduce wear when no duplicating film cards are being developed, a developer timer 145 (FIG. 2) is connected to the developer drive motor 110. The developer timer 145 provides a 30 second timing sequence during which time the drive motor 110 is energized. The timing sequence is initiated by the momentary closing of a switch 147. The switch 147 is a momentary contact type switch and may be disposed in the upper corner of the developer unit 14 as shown in FIG. 1, or in any other convenient location. The switch 147 is conveniently positioned near the slot 126 to permit the operator to insert the exposed duplicating film card 60 into the slot 26 and to adjust the position of the card 60 for proper alignment with the rollers 118 and 120. After proper alignment has been achieved, the switch 147 is depressed to initiate the operation of the rollers for the 30 second developing cycle. During the 30 second developing cycle, the duplicating film card 60 is passed through the hot plate developer 100, and the developed film card is automatically expelled. The developer drive motor 110 is automatically turned off at the end of the 30 second developing cycle. The process may be repeated as many times as desired when multiple copies are being made.

The ammonia container 102 utilizes a disposable ammonia bottle 146. The ammonia bottle 146 is filled with a concentrated liquid solution of ammonium hydroxide to a level 148 below the top of the bottle 146. The ammonium hydroxide solution is purchased in the bottle 146, and the bottle is discarded after the solution has been depleted. A screw type storage cap 149 (FIG. 12) is provided to prevent the leakage of the ammonium hydroxide solution during transport and storage of the bottle. A penetrable membrane 150 is attached to the mouth of the bottle 146 to prevent the escape of ammonia when the storage cap 149 is removed.

The ammonia container 102 includes a cap 152 (FIGS. 7 and 8) pivotally attached to the housing of the machine 10. A torsion spring 153 may be employed to resiliently bias the cap 152 in a downward position, or alternatively the spring 153 may be omitted and the cap 152 may be manually pivoted into engagement with the bottle 146. Extending from the cap 152 is an ammonia pick up tube 154 and an air tube 156. The tubes 154 and 156 may be fabricated from any rigid material that is chemically resistant to ammonia and ammonium hydroxide. The protruding ends of the tubes 154 and 156 are diagonally truncated with the openings in the tubes facing away from each other. The tubes 154 and 156 extend into the bottle 146 to a level above the level 148 of the ammonium hydroxide solution. The positioning of the tubes 154 and 156 above the level 148 permits ammonia emanating from the ammonium hydroxide solution in gaseous form to be withdrawn from the bottle 146 without withdrawing any ammonium hydroxide solution.

In order to withdraw ammonia from the bottle 146, air is forced into the air tube 156 by means of the blower 106 and the tube 108. The air forced into the bottle 146 forces the ammonia emanating from the ammonium hydroxide solution into the hot plate developer 100 through the tube 104. The openings of the tubes 154 and 156 are faced away from each other to prevent air from the air tube 156 from entering the ammonia tube 154 directly. As a result, the air from the air tube is routed through the bottle 146 and becomes mixed with ammonia prior to being withdrawn by the ammonia tube 154.

Figure 6:
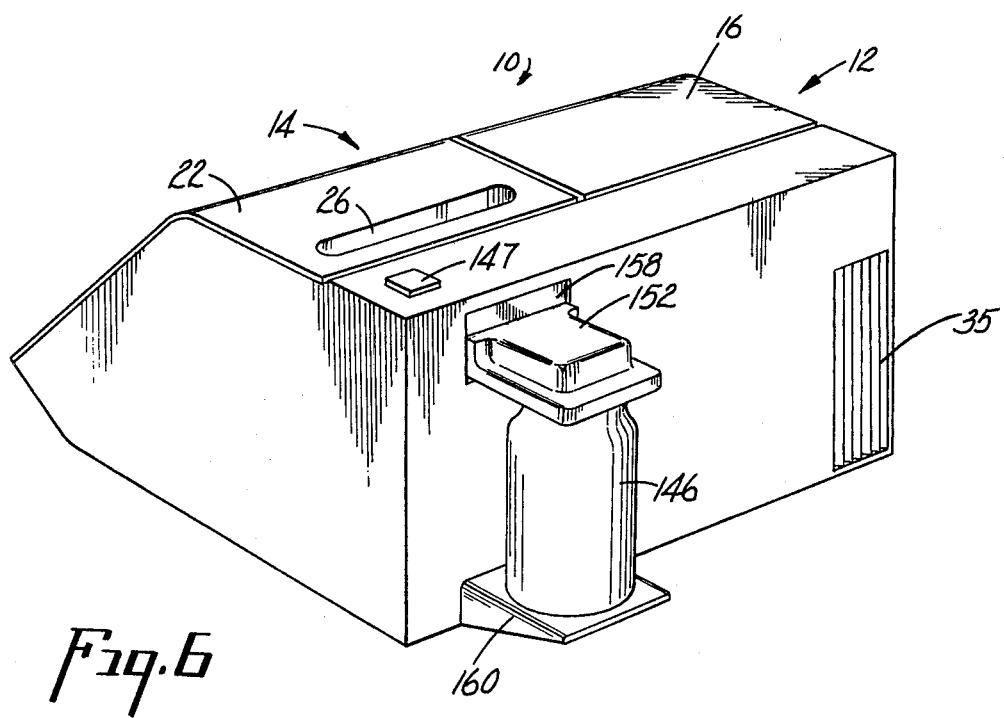
FIG. 6 is a rear perspective view of the duplicating machine of FIG. 1.

The diagonal truncation of the tubes 154 and 156 also provides a pair of sharp points for puncturing the membrane 150 of the ammonia bottle 146 when a new ammonia bottle is inserted. Replacement of the ammonia bottle 146 is accomplished by pivoting the cap 152 upward by exerting finger pressure in a horizontal direction on a member 158 (FIGS. 1 and 6). The member 158 comprises a laminated structure formed by a pair of members 158a and 158b. The member 158a limits the downward motion of the cap 152, and the member 158b has a top edge 158c that engages an opening 159 in the housing 32 to maintain the cap 152 latched in engagement with the bottle 146. After the cap 152 has been pivoted upward, the replacement process is completed by removing the depleted ammonia bottle, removing the screw cap 149 from a new ammonia bottle 146, placing the new ammonia bottle 146 on a bracket 160 extending from the machine 10 and lowering the cap 152 over the new ammonia bottle 146. If the spring 153 is employed, the cap 152 is resiliently biased in a downward direction by the spring 153 and causes the tubes 154 and 156 to puncture the membrane 150 of the ammonia bottle 146. If no spring 153 is employed, the membrane 150 may be punctured by applying manual pressure to the cap 152. Leakage around the mouth of the bottle is prevented by a seal 162 which is maintained in engagement with the mouth of the bottle by the latching action of the member 158b.

Although a specific embodiment of the invention has been disclosed, it should be noted that modification readily made by one skilled in the art still falls within the scope and spirit of the invention. The details of the illustrated embodiment are not intended to limit the scope of the present invention as set forth in the following claims.

What is claimed is:

1. An exposure system comprising:
   a light transparent platen;
   a light source disposed on one side of said platen;
   a shutter mechanism interposed between said light source and said transparent platen, said shutter mechanism having an open condition of operation for passing light from said light source to said platen and a closed condition of operation for blocking the passage of light from said light source to said platen;
   a cover disposed on the opposite side of said platen, said cover having an open position for providing access to said platen and a closed position for covering said platen;
   first resilient biasing means mechanically coupled to said cover for biasing said cover to a partially open position;
   second resilient biasing means mechanically coupled to said shutter mechanism for biasing said shutter mechanism to said closed condition of operation;
   linkage means mechanically coupling said shutter mechanism, said cover and said second resilient biasing means, said linkage means being responsive to the position of said cover for operating said shutter mechanism to the open condition of operation against the force of said second resilient biasing means when said cover is placed in the closed position, said linkage means including means for transmitting force from said second resilient biasing means to said shutter mechanism for operating said shutter mechanism to said closed condition of operation when said cover is biased to said partially open position by said first resilient biasing means;
   timing means responsive to the closing of said cover for initiating a timing interval; and
   means for latching said cover in the closed position against the force of said first resilient biasing means, said latching means being responsive to said timing means for releasing said cover upon the completion of said timing interval.

2. The system recited in claim 1 further including a solenoid actuator mechanically coupled to said latching means for releasing said latching means in response to an electrical signal and manually actuable means for manually releasing said latching means.

3. The system recited in claim 2 wherein said timing means includes an electrically operated timer having means for manually adjusting the length of the timing interval.

4. The system recited in claim 3 wherein said linkage means includes a shutter actuating member extending from said cover for engaging said force transmitting means.

5. The system recited in claim 4 wherein said shutter mechanism includes a pair of shutters.

6. The system recited in claim 5 wherein each of said shutters has a light seal attached to one edge thereof, said light seals making physical contact when said shutter mechanism is operated to the closed condition of operation.

7. The system recited in claim 1 wherein said light source includes a mercury vapor lamp.

8. An exposure system as recited in claim 1 wherein said platen is a curved platen and said first resilient biasing means includes a flexible band supported between two points on said cover and positioned to contact said curved platen upon closure of said cover and to exert a resilient biasing force against said platen when said cover is in said closed position.

9. An exposure system as recited in claim 8 further including an extensible resilient biasing member attached to said cover and to one end of said band.

10. An exposure system as recited in claim 9 wherein said extensible resilient biasing member includes an extensible spring.

11. An exposure system as recited in claim 10 further including an elongated roller rotatably mounted to said cover, and wherein said band passes over said roller and is supported thereby.

12. An exposure system for exposing images from an original film card onto a duplicating film card comprising:
    a housing;
    a light source mounted within said housing;
    a light transparent platen disposed on one wall of said housing, said platen being positioned for illumination by said light source and adapted to support an original film card and a duplicating film card;
    a shutter mechanism interposed between said light source and said transparent platen, said shutter mechanism having an open condition of operation for passing light from said light source to said platen for illuminating an original film card and a duplicating film card and a closed condition of operation for blocking the passage of light from said light source to said platen;
    a cover having an open and a closed position disposed over said transparent platen, said cover including means for retaining an original film card and a duplicating film card between said cover and said platen, wherein said retaining means includes first resilient biasing means mechanically coupled to said cover for biasing said cover to a partially open position;
    linkage means mechanically coupled to said shutter mechanism and responsive to the position of said cover for operating said shutter mechanism to the open condition of operation when said cover is placed in the closed position;
    second resilient biasing means mechanically coupled to said linkage means for biasing said shutter to said closed condition of operation when said cover is not in the closed position;
    means mechanically coupling said cover to said linkage means for transmitting force from said cover to said linkage means for operating said shutter to said open condition of operation against the force of said second resilient biasing means;
    a timer responsive to the closing of said cover for initiating a timing interval; and
    a latch retaining said cover in the closed position against the force of said first resilient biasing means, said latch being responsive to said timer and releasing said cover at the end of said timing interval to permit said cover to be partially opened by said first resilient biasing means and said shutter mechanism to be operated to said closed condition of operation by said second resilient biasing means.

13. An exposure system as recited in claim 12 wherein said latching means includes manually operable means for permitting the cover to be manually released.

14. The system recited in claim 12 wherein said timer is an electrically operated timer having means for providing an electrical signal at the end of said timing interval, and said latch includes means responsive to said electrical signal for releasing said cover.

15. The system recited in claim 14 wherein said timer includes a manually variable resistance element for changing the duration of said time interval, and said electrical signal responsive means includes a solenoid actuator.

16. An exposure system as recited in claim 12 wherein said shutter mechanism includes first and second pivotally mounted shutters and said linkage means includes first and second linkage members each having one end pivotally connected to one of said first and second shutters, respectively, the other ends of said linkage members being pivotally connected together to form a junction, and a third linkage member having one end pivotally connected to said housing and another end pivotally connected to the junction of said first and second linkage members.

17. The system recited in claim 16 wherein each of said shutters has a light seal attached to an edge thereof, said light seals contacting each other when said shutter mechanism is in the closed condition of operation.

18. An exposure system as recited in claim 16 wherein said mechanical coupling means includes an elongated actuating member affixed to said cover, wherein said housing has an aperture defined therein for receiving said actuating member when said cover is in said closed position, said actuating member being operative to engage said linkage means for rendering said linkage means operative to operate said shutter mechanism to said open condition of operation when said cover is moved to the closed position.

19. An exposure system as recited in claim 18 wherein said resilient biasing means is mechanically coupled to one of said linkage members.

20. The system recited in claim 19 wherein said cover includes a recess defined therein for permitting said cover to be manually grasped and moved to the open position.

21. The system recited in claim 18 wherein said actuating member has a predetermined length for engaging said linkage prior to the complete closing of said cover.

22. The system recited in claim 21 wherein said light source includes a mercury vapor lamp.

23. An exposure system as recited in claim 18 wherein said resilient biasing means includes a torsion spring.

* * * * *